(12) United States Patent
Sorensen et al.

(10) Patent No.: US 6,528,004 B1
(45) Date of Patent: Mar. 4, 2003

(54) REMOVAL OF PORTIONS OF CABLE TIE WHILE SEPARATING MOLD PARTS

(75) Inventors: Soren Christian Sorensen, Grand Cayman (KY); Jens Ole Sorensen, Grand Cayman (KY)

(73) Assignee: Soren Christian Sorensen, Grand Cayman (KY)

( * ) Notice: Subject to any disclaimer, the term of this patent is extended or adjusted under 35 U.S.C. 154(b) by 155 days.

(21) Appl. No.: 09/858,342

(22) Filed: May 14, 2001

(51) Int. Cl.[7] .................. B29C 33/42; B29C 33/44; B29C 45/44
(52) U.S. Cl. .................. 264/318; 264/328.1; 264/334
(58) Field of Search .................. 264/299, 318, 264/328.1, 328.14, 328.16, 334; 425/129.1, DIG. 58, 556, 436 R, 441, 444; 24/16 R, 16 PB, 17 AP, 30.5 R, 30.5 P

(56) References Cited

U.S. PATENT DOCUMENTS

| | | |
|---|---|---|
| 2,929,105 A | 3/1960 | Starck et al. |
| 3,093,865 A | 6/1963 | Peters et al. |
| 3,159,878 A | 12/1964 | Scott, Jr. et al. |
| 3,537,676 A | 11/1970 | Miller |
| 3,737,490 A | 6/1973 | Nicholson |
| 3,739,429 A | 6/1973 | Kohke |
| 3,776,676 A | 12/1973 | Kessler |
| 3,898,315 A | 8/1975 | Haag |
| 3,924,299 A | 12/1975 | McCormick |
| 3,965,538 A | 6/1976 | Caveney et al. |
| 4,005,164 A | 1/1977 | Procter |
| 4,076,483 A | 2/1978 | Smirne |
| 4,192,701 A | 3/1980 | Martin et al. |
| 4,238,106 A | 12/1980 | Willingham |
| 4,354,995 A | 10/1982 | Wiechard |
| 4,427,618 A | 1/1984 | Sorensen |
| 4,432,127 A | 2/1984 | Diazzi |
| 4,473,524 A | 9/1984 | Paradis |
| 4,562,990 A | 1/1986 | Rose |
| 4,666,323 A | 5/1987 | Kessler |

(List continued on next page.)

FOREIGN PATENT DOCUMENTS

| | | |
|---|---|---|
| DE | 1145783 | 3/1963 |
| DE | 1485656 | 2/1970 |
| DE | 1800861 | 5/1970 |
| DE | 1778056 | 7/1971 |
| GB | 1006373 | 9/1965 |
| GB | 1287651 | 9/1972 |

OTHER PUBLICATIONS

Patent Abstracts of Japan, Publication No. 60196232, Apr. 10, 1985.

Primary Examiner—Angela Ortiz
(74) Attorney, Agent, or Firm—Edward W. Callan

(57) ABSTRACT

A cable tie having a locking head and a strap terminating in a tip is formed by injecting plastic into a mold cavity defined by first and second mold parts. The first mold part includes head and tip regions respectively defining portions of the head and the tip. The first and second mold parts define a strap region for forming a portion of the strap that extends between the head and the tip. Upon initial separation of the mold parts, portions of the head and the tip are retained in the head and tip regions of the first mold part and a portion of the strap is retained in the second mold part to thereby remove the tip and the head from the second mold part and portions of the strap from the mold parts. Upon further separation of the mold parts some previously retained portions are thereby removed.

20 Claims, 6 Drawing Sheets

U.S. PATENT DOCUMENTS

| | | | | |
|---|---|---|---|---|
| 4,688,302 | A | 8/1987 | Caveney et al. | |
| 4,730,615 | A | 3/1988 | Sutherland et al. | |
| 4,776,067 | A | 10/1988 | Sorensen | |
| 4,793,793 | A | 12/1988 | Swenson et al. | |
| 4,833,741 | A | 5/1989 | Mizuno et al. | |
| 4,880,587 | A | 11/1989 | Fichlseder et al. | |
| 4,902,218 | A | 2/1990 | Leonard et al. | |
| 4,944,475 | A | 7/1990 | Ono et al. | |
| 5,002,480 | A | 3/1991 | Gellert et al. | |
| 5,006,288 | A | 4/1991 | Rhodes, Jr. et al. | |
| 5,028,225 | A | 7/1991 | Staheli | |
| 5,042,535 | A | 8/1991 | Schlottke | |
| 5,053,179 | A | 10/1991 | Masui et al. | |
| 5,096,651 | A | 3/1992 | le Comte | |
| 5,123,686 | A | 6/1992 | Wenk | |
| 5,131,613 | A | 7/1992 | Kamiya et al. | |
| 5,135,694 | A | 8/1992 | Akahane et al. | |
| 5,146,654 | A | 9/1992 | Caveney et al. | |
| 5,372,773 | A | 12/1994 | Sorensen et al. | |
| 5,389,330 | A * | 2/1995 | Sorensen et al. | 264/328.1 |
| 5,470,520 | A * | 11/1995 | Sorensen et al. | 264/297.2 |
| 5,593,630 | A * | 1/1997 | Sorensen et al. | 264/219 |
| 5,690,883 | A * | 11/1997 | Sorensen et al. | 264/318 |
| 5,693,282 | A | 12/1997 | Sorensen et al. | |
| 5,716,579 | A * | 2/1998 | Sorensen et al. | 264/318 |
| 5,746,965 | A * | 5/1998 | Sorensen et al. | 264/318 |
| 5,846,473 | A * | 12/1998 | Sorensen et al. | 264/318 |
| 6,044,524 | A * | 4/2000 | Sorensen et al. | 24/16 PB |
| 6,190,599 | B1 * | 2/2001 | Sorensen et al. | 264/318 |
| 6,217,813 | B1 | 4/2001 | Sorensen et al. | |

* cited by examiner

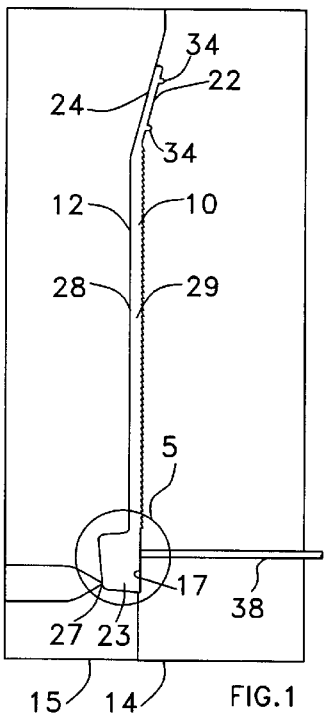
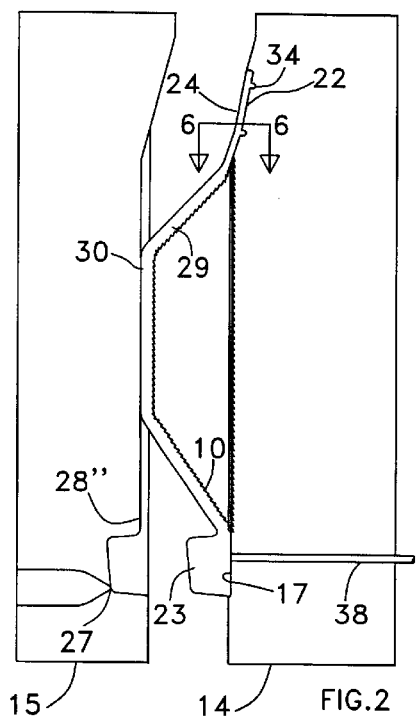
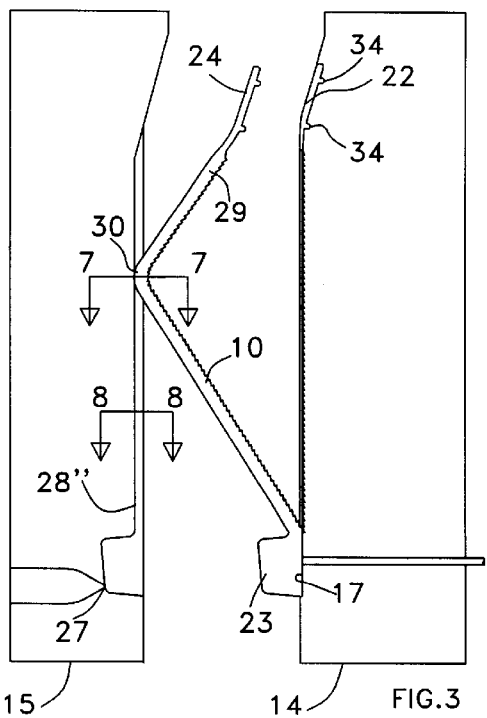
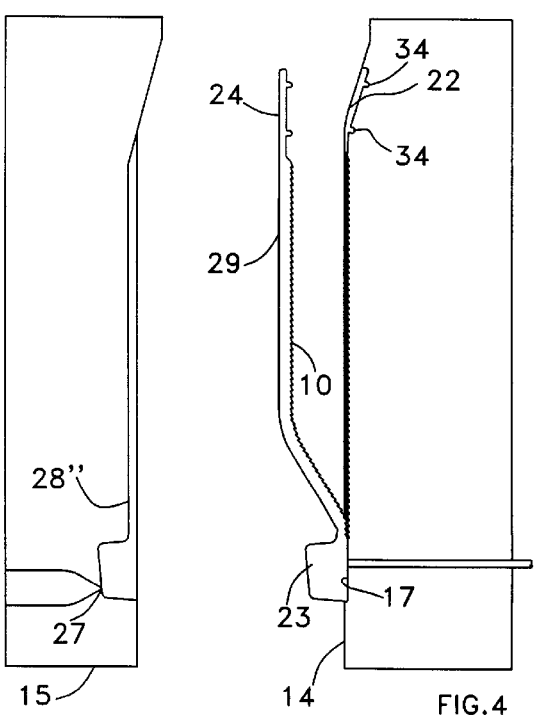

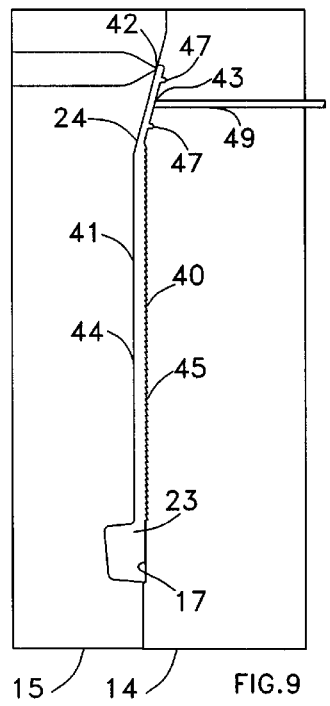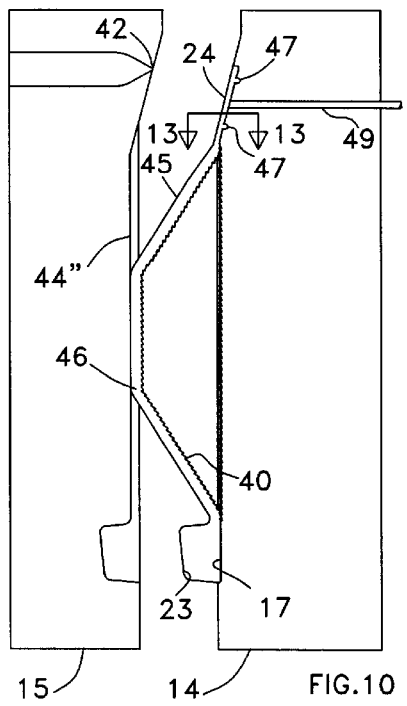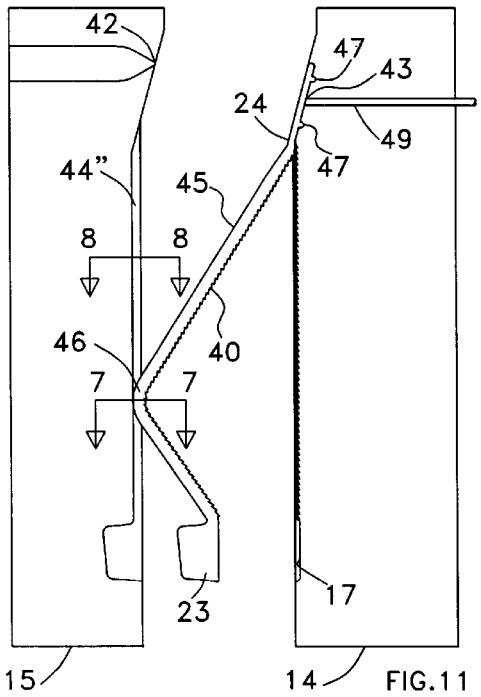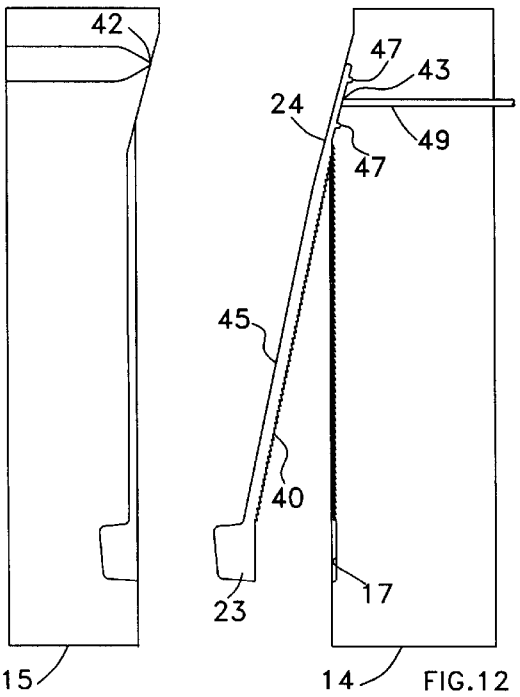

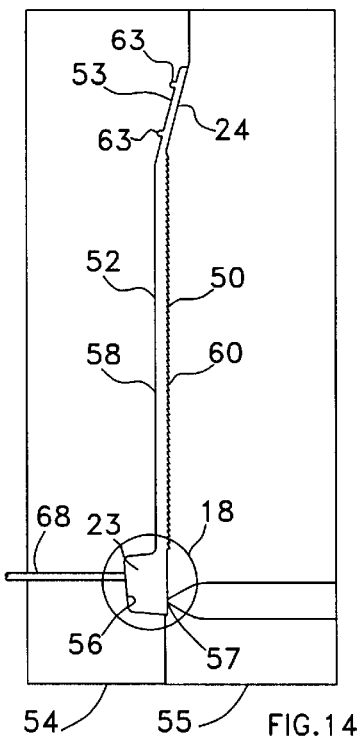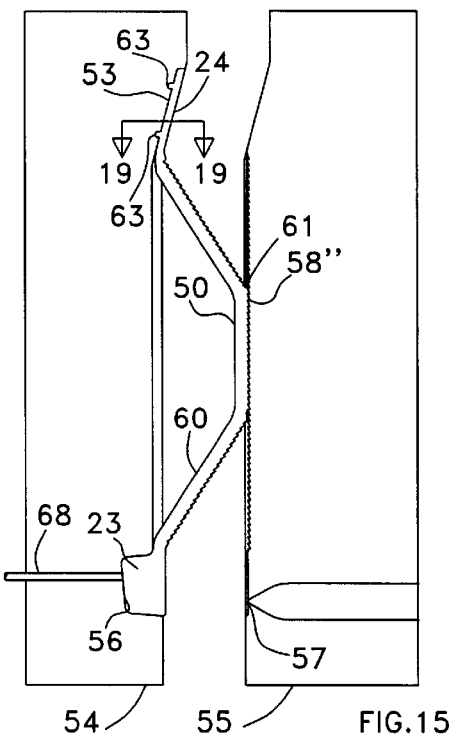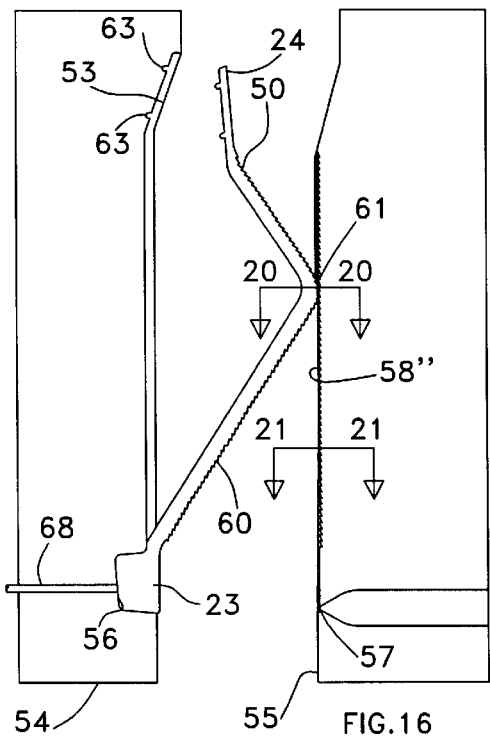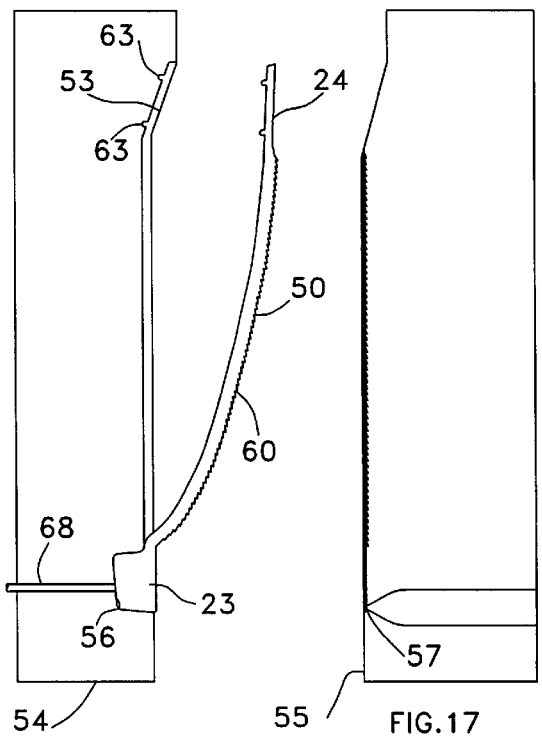

REMOVAL OF PORTIONS OF CABLE TIE WHILE SEPARATING MOLD PARTS

BACKGROUND OF THE INVENTION

The present invention generally pertains to injection molding of cable ties, and is particularly directed to methods that facilitate removal of a cable tie from the mold parts.

A cable tie may be used for bundling together articles such as cables or the like by forming and locking a closed loop around the articles. Cable ties also have other uses. Cable ties are also known as cable straps, cable clamps, cable clips, bundling ties, bundling straps, bundling clips, bundle ties, bundling belts, wire ties, ring clamps, adjustable clamps, harnessing devices, strap seals, binding straps, and ties. A cable tie includes a locking head, a strap extending from the head and terminating in a tip for passing through an opening in the head, and ratchet teeth on at least one side of the strap, wherein the locking head includes a pawl having teeth with surfaces for engaging the ratchet teeth to lock the strap in the locking head after the tip end of the strap has been pulled through the opening in the head. A cable tie may or may not include additional components; and the strap may have two or more sides, one, some or all of which include ratchet teeth. Examples of cable ties are described in U.S. Pat. Nos. 3,739,429; 3,924,299; 3,965,538; 4,473,524; 4,573,242 and 5,372,773.

Cable ties are manufactured economically by a cyclic injection molding method, in which molten plastic material is injected into a mold cavity defining the cable tie and then allowed to solidify within the mold cavity. The mold parts defining the mold cavity are then separated and the cable tie is removed from the mold parts. A preferred plastic material for cable ties is nylon, although other plastic materials may be used.

One method of injection molding a typical cable tie, as described above, that facilitates removal of the cable tie from the mold parts is described in U.S. Pat. No. 5,372,773. Such method includes the steps of:

(a) forming the cable tie by injecting molten plastic material into a mold cavity defined by a first mold part combined with a second mold part, wherein the first mold part includes a head region defining a portion of the head of the cable tie and the second mold part includes a tip region defining a portion of the tip of the cable tie;

(b) separating the first mold part from the second mold part while retaining said portion of the head of the cable tie in the head region of the first mold part and said portion of the tip of the cable tie in the tip region of the second mold part, to separate the head from the second mold part, to separate the tip from the first mold part, and to separate a major portion of the strap of the cable tie from the first and second mold parts;

(c) further separating the first mold part from the second mold part while still retaining said portion of the head of the cable tie in the head region of the first mold part to thereby remove said portion of the tip of the cable tie from the tip region of the second mold part; and (d) subsequent to step (c), removing the head of the cable tie from the head region of the first mold part.

SUMMARY OF THE INVENTION

The present invention provides a method of injection molding a cable tie having a locking head, a strap extending from the head and terminating in a tip for passing through an opening in the head, and ratchet teeth on at least one side of the strap, wherein the locking head includes a pawl having teeth with surfaces for engaging the ratchet teeth to lock the strap in the locking head after the tip end of the strap has been pulled through the opening in the head, the method comprising the steps of (a) forming the cable tie by injecting molten plastic material into a mold cavity defined by a first mold part combined with a second mold part, wherein the first mold part includes a tip region defining a portion of the tip of the cable tie and a head region defining a portion of the head of the cable tie, and said mold parts further define a strap region for forming a portion of the strap that extends between the head and the tip of the cable tie;

(b) separating the first mold part from the second mold part while retaining said portion of the tip in the tip region of the first mold part, said portion of the head in the head region of the first mold part and a portion of the strap in the strap region of the second mold part, to remove the tip from the second mold part, to remove the head from the second mold part, and to remove portions of the strap from the first mold part; and (c) removing said retained portions of the cable tie from the mold parts.

Additional features of the present invention are described with reference to the detailed description of the preferred embodiments.

BRIEF DESCRIPTION OF THE DRAWING

FIG. 1 is a diagram showing formation of a cable tie in a mold cavity defined by first and second mold parts in one preferred embodiment of the present invention.

FIG. 2 is a diagram showing retention of a portion of the head of the cable tie in a first mold part, retention of a portion of the tip of the cable tie in the first mold part, and retention of a portion of the strap of the cable tie in a second mold part upon initial separation of the mold parts in the embodiment of FIG. 1.

FIG. 3 is a diagram showing retention of a portion of the head of the cable tie in the first mold part, retention of a portion of the strap of the cable tie in the second mold part, and removal of the tip of the cable tie from the first mold part upon further separation of the mold parts in the embodiment of FIG. 1.

FIG. 4 is a diagram showing retention of a portion of the head of the cable tie in the first mold part and removal of the strap of the cable tie from the second mold part upon still further separation of the mold parts in the embodiment of FIG. 1.

FIG. 9 is a diagram showing formation of a cable tie in a mold cavity defined by the mold parts in another preferred embodiment of the present invention.

FIG. 10 is a diagram showing retention of a portion of the tip of the cable tie in a first mold part, retention of a portion of the head of the cable tie in the first mold part, and retention of a portion of the strap of the cable tie in a second mold part upon initial separation of the mold parts in the embodiment of FIG. 9.

FIG. 11 is a diagram showing retention of a portion of the tip of the cable tie in the first mold part, retention of a portion of the strap of the cable tie in the second mold part, and removal of the head of the cable tie from the first mold part upon further separation of the mold parts in the embodiment of FIG. 9.

FIG. 12 is a diagram showing retention of a portion of the tip of the cable tie in the first mold part and removal of the strap of the cable tie from the second mold part upon still further separation of the mold parts in the embodiment of FIG. 9.

FIG. 14 is a diagram showing formation of a cable tie in a mold cavity defined by first and second mold parts in still another preferred embodiment of the present invention.

FIG. 15 is a diagram showing retention of a portion of the head of the cable tie in a first mold part, retention of a portion of the tip of the cable tie in the first mold part, and retention of a portion of the strap of the cable tie in a second mold part upon initial separation of the mold parts in the embodiment of FIG. 14.

FIG. 16 is a diagram showing retention of a portion of the head of the cable tie in the first mold part, retention of a portion of the strap of the cable tie in the second mold part, and removal of the tip of the cable tie from the first mold part upon further separation of the mold parts in the embodiment of FIG. 14.

FIG. 17 is a diagram showing retention of a portion of the head of the cable tie in the first mold part and removal of the strap of the cable tie from the second mold part upon still further separation of the mold parts in the embodiment of FIG. 14.

DETAILED DESCRIPTION

Figure 5:
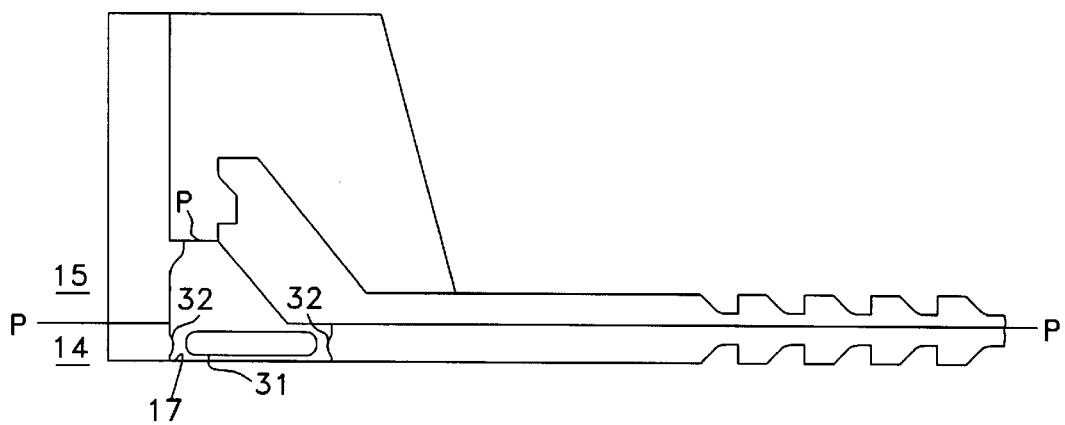
FIG. 5 illustrates undercuts in the head region of the first mold part in an enlarged view of an area 5 in FIG. 1 encompassing the head region of the mold cavity in the embodiments of FIGS. 1 and 9.

Referring to FIGS. 1–4, in one preferred embodiment, a cable tie 10 is formed, as shown in FIG. 1, by injecting molten plastic material into a mold cavity 12 defined by a first mold part 14 (shown on the right) combined with a second mold part 15. The first mold part 14 includes a head region 17 defining a portion of the head 23 of the cable tie 10 and a tip region 22 defining a portion of the tip 24 of the cable tie 10. The first and second mold parts 14, 15 further define a strap region 28 for forming a portion of the strap 29 that extends between the head 23 and the tip 24 of the cable tie 10. The molten plastic material is injected into the mold cavity 12 through a gate 27 that is located in the second mold part 15 adjacent the head 23 of the cable tie 10 formed by such injection.

The first mold part 14 is initially separated from the second mold part 15, as shown in FIG. 2, while retaining a portion of the head 23 in the head region 17 of the first mold part 14, a portion of the tip 24 in the tip region 22 of the first mold part 14, and a portion 30 of the strap 29 in the strap region 28" of the second mold part 15, whereupon the head 23 is separated from the second mold part 15, the tip 24 is separated from the second mold part 15, and portions of the strap 29 are separated from both the first and second mold parts 14, 15.

Figure 6:
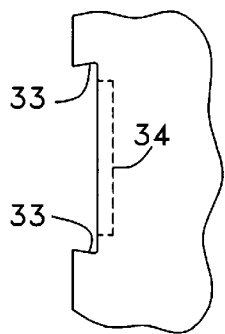
FIG. 6 illustrates undercuts within the tip region of the first mold part in the embodiment of FIG. 1, as seen along lines 6—6 in FIG. 2.
Figure 7:
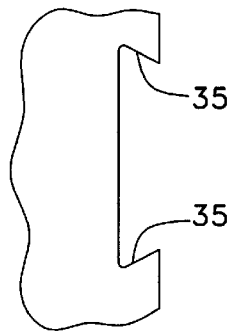
FIG. 7 illustrates undercuts within one portion of the strap region of the second mold part in the embodiments of FIGS. 1 and 9, as seen along lines 7—7 in FIGS. 3 and 11.
Figure 8:
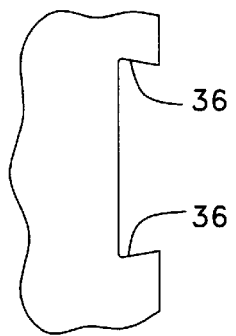
FIG. 8 illustrates undercuts within another portion of the strap region of the second mold part in the embodiments of FIG. 1 and 9, as seen along lines 8—8 in FIGS. 3 and 11.

During the initial separation of the first mold part 14 from the second mold part 15, (a) undercuts 31, 32 located in the first mold part 14, as shown in FIG. 5, are used to retain a portion of the head 23 in the head region 17 of the first mold part 14; (b) undercuts 33, 34 located in the first mold part 14, as shown in FIG. 6, are used to retain a portion of the tip 24 in the tip region 22 of the first mold part 14; and (c) undercuts 35, 36 respectively located in sections 7—7 and 8—8 of the strap region 28" of the second mold part 15, as shown in FIGS. 7 and 8, are used to retain the portion 30 of the strap 29 in the strap region 28" of the second mold part 15. The first and second mold parts 14, 15 are separated from each other along a parting surface P shown in FIG. 5.

Figure 20:
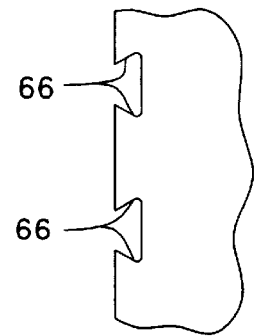
FIG. 20 illustrates undercuts within one portion of the strap region of the second mold part in the embodiments of FIGS. 14 and 22, as seen along lines 20—20 in FIGS. 16 and 24.
Figure 21:
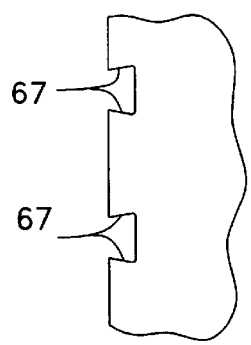
FIG. 21 illustrates undercuts within another portion of the strap region of the second mold part in the embodiments of FIGS. 14 and 22, as seen along lines 21—21 in FIGS. 16 and 24.

With regard to FIG. 5 showing a mold cavity that defines a cable tie having ratchet teeth on both sides of the strap, whereas FIGS. 1–4 show ratchet teeth on only one side of the strap, it is not material to the method of the present invention whether the strap includes teeth on one or both sides of the strap. However, the pattern of undercuts shown in FIGS. 7 and 8 is preferred for a side of the strap that does not include ratchet teeth and he pattern of undercuts shown in FIGS. 20 and 21 is preferred for a side of the strap that includes ratchet teeth.

The first mold part 14 is further separated from the second mold part 15, as shown in FIG. 3, while still retaining a portion of the head 23 in the head region 17 of the first mold part 14 and a portion 30 of the strap 29 in the strap region 28" of the second mold part 15, to thereby remove the previously retained portion of the tip 24 from the tip region 22 of the first mold part 14. The relative dimensions of the undercuts 35 in section 7—7 of the strap region 28" of the second mold part 15 and the undercuts 33, 34 in the tip region 22 of the first mold part 14 are such that during the further separation of the first and second mold parts 14, 15 shown in FIG. 3 the retention of the portion 30 of the strap 29 by the undercuts 35 located in section 7—7 of the strap region 28" of the second mold part 15 overcomes the retention of the portion of the tip 24 by the undercuts 33, 34 located in the tip region 22 of the first mold part 14 so that during such further separation of the first and second mold parts 14, 15 the portion 30 of the strap 29 is still retained in the strap region 28" of the second mold part 15 and the previously retained portion of the tip 24 is then thereby removed from the tip region 22 of the first mold part 14.

The relative dimensions of the undercuts 31, 32 in the head region 17 of the first mold part 14 and the undercuts 36 in section 8—8 of the strap region 28" of the second mold part 15 are such that during the further separation of the first and second mold parts 14, 15 shown in FIG. 3 the retention of the portion of the head 23 by the undercuts 31, 32 located in the head region 17 of the first mold part 14 overcomes the retention of the strap 29 by the undercuts 36 located in section 8—8 of the strap region 28" of the second mold part 15 so that during such further separation of the first and second mold parts 14, 15 the portion of the head 23 is still retained in the head region 17 of the first mold part 14 and the portion of the strap 29 previously retained in section 8—8 of the strap region 28" is then thereby removed from the strap region 28" of the second mold part 15.

The first mold part 14 is still further separated from the second mold part 15, as shown in FIG. 4, while still retaining a portion of the head 23 in the head region 17 of the first mold part 14, to thereby remove the previously retained portion 30 of the strap 29 from the strap region 28" of the second mold part 15. The relative dimensions of the undercuts 31, 32 in the head region 17 of the first mold part 14 and the undercuts 35 in section 7—7 of the strap region 28" of the second mold part 15 are such that during the still further separation of the first and second mold parts 14, 15 shown in FIG. 4 the retention of the portion of the head 23 by the undercuts 31, 32 located in the head region 17 of the first mold part 14 overcomes the retention of the strap 29 by the undercuts 35 located in section 7—7 of the strap region 28" of the second mold part 15 so that during such still further separation of the first and second mold parts 14, 15 the portion of the head 23 is still retained in the head region 17 of the first mold part 14 and the only remaining portion 30 of the strap 29 previously retained in section 7—7 of the strap region 28" is then thereby removed from the strap region 28" of the second mold part 15.

Subsequently, the previously retained portion of the head 23 of the cable tie 10 is ejected from the head region 17 of the first mold part 14 by using at least one ejector pin 38 or preferably a plurality of ejector pins located in the first mold part 14 adjacent the head region 17. Then the ejected cable tie 10 is removed from the space between the first and second mold parts 14, 15 by imparting a forceful fluid stream against the ejected cable tie 10, or by utilizing other means, such as robotics or gravity.

Referring to FIGS. 9–12, in another preferred embodiment, a cable tie 40 is formed, as shown in FIG. 9, by injecting molten plastic material into a mold cavity 41 defined by a first mold part 14 combined with a second mold part 15. The first mold part 14 includes a head region 17 defining a portion of the head 20 of the cable tie 40 and a tip region 43 defining a portion of the tip 24 of the cable tie 40. The first and second mold parts 14, 15 further define a strap region 44 for forming a portion of the strap 45 that extends between the head 23 and the tip 24 of the cable tie 40. The molten plastic material is injected into the mold cavity 12 through a gate 42 that is located in the second mold part 15 adjacent the tip 24 of the cable tie 40 formed by such injection.

The first mold part 14 is initially separated from the second mold part 15, as shown in FIG. 10, while retaining a portion of the head 23 in the head region 17 of the first mold part 14, a portion of the tip 24 in the tip region 43 of the first mold part 14, and a portion 46 of the strap 45 in the strap region 44" of the second mold part 15, whereupon the head 23 is separated from the second mold part 15, the tip 24 is separated from the second mold part 15, and portions of the strap 45 are separated from both the first and second mold parts 14, 15.

Figure 13:
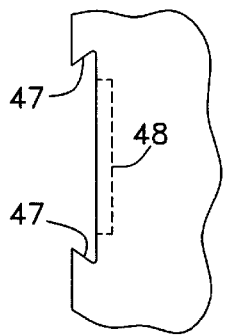
FIG. 13 illustrates undercuts within the tip region of the first mold part in the embodiment of FIG. 9, as seen along lines 13—13 in FIG. 10.

During the initial separation of the first mold part 14 from the second mold part 15, (a) undercuts 31, 32 located in the first mold part 14, as shown in FIG. 5, are used to retain a portion of the head 23 in the head region 17 of the first mold part 14; (b) undercuts.47, 48 located in the first mold part 14, as shown in FIG. 13, are used to retain a portion of the tip 24 in the tip region 43 of the first mold part 14; and (c) undercuts 35, 36 respectively located in sections 7—7 and 8—8 of the strap region 44" of the second mold part 15, as shown in FIGS. 7 and 8, are used to retain the portion 46 of the strap 45 in the strap region 44" of the second mold part 15. The first and second mold parts 14, 15 are separated from each other along the parting surface P shown in FIG. 5.

The first mold part 14 is further separated from the second mold part 15, as shown in FIG. 11, while still retaining a portion of the tip 24 in the tip region 43 of the first mold part 14 and a portion 46 of the strap 45 in the strap region 44" of the second mold part 15, to thereby remove the previously retained portion of the head 23 from the head region 17 of the first mold part 14. The relative dimensions of the undercuts 35 in section 7—7 of the strap region 44" of the second mold part 15 and the undercuts 31, 32 in the head region 17 of the first mold part 14 are such that during the further separation of the first and second mold parts 14, 15 shown in FIG. 11 the retention of the portion 46 of the strap 45 by the undercuts 35 located in section 7—7 of the strap region 44" of the second mold part 15 overcomes the retention of the portion of the head 23 by the undercuts 31, 32 located in the head region 17 of the first mold part 14 so that during such further separation of the first and second mold parts 14, 15 the portion 46 of the strap 45 is still retained in the strap region 44" of the second mold part 15 and the previously retained portion of the head 23 is then thereby removed from the head region 17 of the first mold part 14.

The relative dimensions of the undercuts 47, 48 in the tip region 43 of the first mold part 14 and the undercuts 36 in section 8—8 of the strap region 44" of the second mold part 15 are such that during the further separation of the first and second mold parts 14, 15 shown in FIG. 11 the retention of the portion of the tip 24 by the undercuts 47, 48 located in the tip region 43 of the first mold part 14 overcomes the retention of the strap 45 by the undercuts 36 located in section 8—8 of the strap region 44" of the second mold part 15 so that during such further separation of the first and second mold parts 14, 15 the portion of the tip 24 is still retained in the tip region 43 of the first mold part 14 and the portion of the strap 45 previously retained in section 8—8 of the strap region 44" is then thereby removed from the strap region 44" of the second mold part 15.

The first mold part 14 is still further separated from the second mold part 15, as shown in FIG. 12, while still retaining a portion of the tip 24 in the tip region 43 of the first mold part 14, to thereby remove the previously retained portion 46 of the strap 45 from the strap region 44" of the second mold part 15. The relative dimensions of the undercuts 47, 48 in the tip region 43 of the first mold part 14 and the undercuts 35 in section 7—7 of the strap region 44" of the second mold part 15 are such that during the still further separation of the first and second mold parts 14, 15 shown in FIG. 12 the retention of the portion of the tip 24 by the undercuts 47, 48 located in the tip region 43 of the first mold part 14 overcomes the retention of the strap 45 by the undercuts 35 located in section 7—7 of the strap region 44" of the second mold part 15 so that during such still further separation of the first and second mold parts 14, 15 the portion of the tip 24 is still retained in the tip region 43 of the first mold part 14 and the only remaining portion 46 of the strap 45 previously retained in section 7—7 of the strap region 44" is then thereby removed from the strap region 44" of the second mold part 15.

Subsequently, the previously retained portion of the tip 24 of the cable tie 40 is ejected from the tip region 43 of the first mold part 14 by using at least one ejector pin 49 or preferably a plurality of ejector pins located in the first mold part 14 adjacent the tip region 43. Then the ejected cable tie 40 is removed from the space between the first and second mold parts 14, 15 by imparting a forceful fluid stream against the ejected cable tie 40, or by utilizing other means, such as robotics or gravity.

Referring to FIGS. 14–17, in still another preferred embodiment, a cable tie 50 is formed, as shown in FIG. 14, by injecting molten plastic material into a mold cavity 52 defined by a first mold part 54 (shown on the left) combined with a second mold part 55. The first mold part 54 includes a head region 56 defining a portion of the head 23 of the cable tie 50 and a tip region 53 defining a portion of the tip 24 of the cable tie 50. The first and second mold parts 54, 55 further define a strap region 58 for forming a portion of the strap 60 of the cable tie 50 that extends between the head 23 and the tip 24 of the cable tie 50. The molten plastic material is injected into the mold cavity 52 through a gate 57 that is located in the second mold part 55 adjacent the head 23 of the cable tie 50 formed by such injection.

The first mold part 54 is initially separated from the second mold part 55, as shown in FIG. 15, while retaining a portion of the head 23 in the head region 56 of the first mold part 54, a portion of the tip 24 in the tip region 53 of the first mold part 54, and a portion 61 of the strap 60 in the strap region 58" of the second mold part 55, whereupon the head 23 is separated from the second mold part 55, the tip 24 is separated from the second mold part 55, and portions of the strap 60 are separated from both the first and second mold parts 54, 55.

Figure 18:
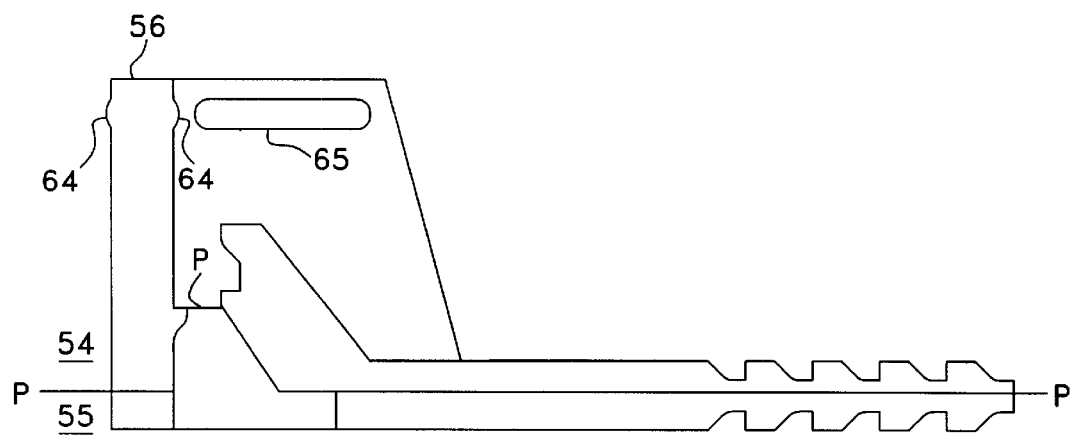
FIG. 18 illustrates undercuts in the head region of the first mold part in an enlarged view of an area 18 in FIG. 14 encompassing the head region of the mold cavity in the embodiments of FIGS. 14 and 22.
Figure 19:
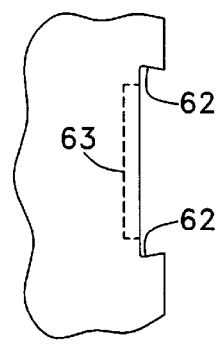
FIG. 19 illustrates undercuts within the tip region of the first mold part in the embodiment of FIG. 14, as seen along lines 19—19 in FIG. 15.

During the initial separation of the first mold part 54 from the second mold part 55, (a) undercuts 64, 65 located in the first mold part 54, as shown in FIG. 18, are used to retain a portion of the head 23 in the head region 56 of the first mold part 54; (b) undercuts 62, 63 located in the first mold part 54, as shown in FIG. 19, are used to retain a portion of the tip 24 in the tip region 53 of the first mold part 54; and (c) undercuts 66, 67 respectively located in sections 20—20 and 21—21 of the strap region 58" of the second mold part 55, as shown in FIGS. 20 and 21, are used to retain the portion 61 of the strap 60 in the strap region 58" of the second mold part 55. The first and second mold parts 54, 55 are separated from each other along a parting surface P shown in FIG. 18.

With regard to FIG. 18 showing a mold cavity that defines a cable tie having ratchet teeth on both sides of the strap, whereas FIGS. 14–17 show ratchet teeth on only one side of the strap, it is not material to the method of the present invention whether the strap includes teeth on one or both sides of the strap. However, the pattern of undercuts shown in FIGS. 20 and 21 is preferred for a side of the strap that includes ratchet teeth and the pattern of undercuts shown in FIGS. 7 and 8 is preferred for a side of the strap that does not include ratchet teeth.

The first mold part 54 is further separated from the second mold part 55, as shown in FIG. 16, while still retaining a portion of the head 23 in the head region 56 of the first mold part 54 and a portion 61 of the strap 60 in the strap region 58" of the second mold part 55, to thereby remove the previously retained portion of the tip 24 from the tip region 53 of the first mold part 54. The relative dimensions of the undercuts 66 in section 20—20 of the strap region 58" of the second mold part 55 and the undercuts 64, 65 in the tip region 53 of the first mold part 54 are such that during the further separation of the first and second mold parts 54, 55 shown in FIG. 16 the retention of the portion 61 of the strap 60 by the undercuts 66 located in section 20—20 of the strap region 58" of the second mold part 55 overcomes the retention of the portion of the tip 24 by the undercuts 62, 63 located in the tip region 53 of the first mold part 54 so that during such further separation of the first and second mold parts 54, 55 the portion 61 of the strap 60 is still retained in the strap region 58" of the second mold part 55 and the previously retained portion of the tip 24 is then thereby removed from the tip region 53 of the first mold part 54.

The relative dimensions of the undercuts 64, 65 in the head region 56 of the first mold part 54 and the undercuts 67 in section 21—21 of the strap region 58" of the second mold part 55 are such that during the further separation of the first and second mold parts 54, 55 shown in FIG. 16 the retention of the portion of the head 23 by the undercuts 64, 65 located in the head region 56 of the first mold part 54 overcomes the retention of the strap 60 by the undercuts 67 located in section 21—21 of the strap region 58" of the second mold part 55 so that during such further separation of the first and second mold parts 54, 55 the portion of the head 23 is still retained in the head region 56 of the first mold part 54 and the portion of the strap 60 previously retained in section 21—21 of the strap region 58" is then thereby removed from the strap region 58" of the second mold part 55.

The first mold part 54 is still further separated from the second mold part 55, as shown in FIG. 17, while still retaining a portion of the head 23 in the head region 56 of the first mold part 54, to thereby remove the previously retained portion 61 of the strap 60 from the strap region 58" of the second mold part 55. The relative dimensions of the undercuts 64, 65 in the head region 56 of the first mold part 54 and the undercuts 66 in section 20—20 of the strap region 58" of the second mold part 55 are such that during the still further separation of the first and second mold parts 54, 55 shown in FIG. 17 the retention of the portion of the head 23 by the undercuts 64, 65 located in the head region 56 of the first mold part 54 overcomes the retention of the strap 60 by the undercuts 66 located in section 20—20 of the strap region 58" of the second mold part 55 so that during such still further separation of the first and second mold parts 54, 55 the portion of the head 23 is still retained in the head region 56 of the first mold part 54 and the only remaining portion 61 of the strap 60 previously retained in section 20—20 of the strap region 58" is then thereby removed from the strap region 58" of the second mold part 55.

Subsequently, the previously retained portion of the head 23 of the cable tie 50 is ejected from the head region 56 of the first mold part 54 by using at least one ejector pin 68 or preferably a plurality of ejector pins located in the first mold part 54 adjacent the head region 17. Then the ejected cable tie 50 is removed from the space between the first and second mold parts 54, 55 by imparting a forceful fluid stream against the ejected cable tie 10, or by utilizing other means, such as robotics or gravity.

Figure 22:
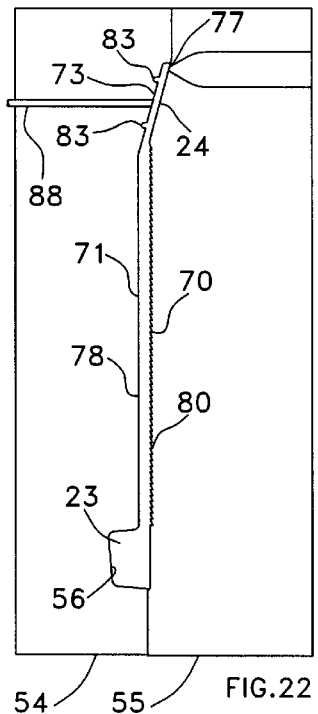
FIG. 22 is a diagram showing formation of a cable tie in a mold cavity defined by the mold parts in yet another preferred embodiment of the present invention.

Referring to FIGS. 22–25, in yet another preferred embodiment, a cable tie 70 is formed, as shown in FIG. 22, by injecting molten plastic material into a mold cavity 71 defined by a first mold part 54 combined with a second mold part 55. The first mold part 54 includes a head region 56 defining a portion of the head 23 of the cable tie 70; and the second mold part 55 includes a tip region 73 defining a portion of the tip 24 of the cable tie 70. The first and second mold parts 54, 55 further define a strap region 78 for forming a portion of the strap 80 that extends between the head 23 and the tip 24 of the cable tie 70. The molten plastic material is injected into the mold cavity 71 through a gate 77 that is located in the second mold part 55 adjacent the tip 24 of the cable tie 70 formed by such injection.

Figure 23:
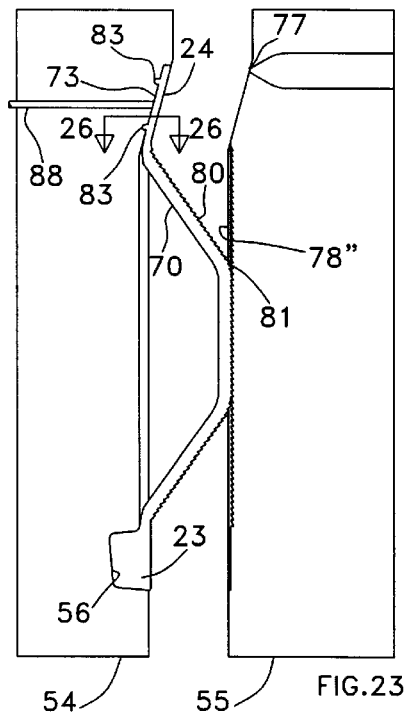
FIG. 23 is a diagram showing retention of a portion of the tip of the cable tie in a first mold part, retention of a portion of the head of the cable tie in the first mold part, and retention of a portion of the strap of the cable tie in a second mold part upon initial separation of the mold parts in the embodiment of FIG. 22.

The first mold part 54 is initially separated from the second mold part 55, as shown in FIG. 23, while retaining a portion of the head 23 in the head region 56 of the first mold part 54, a portion of the tip 24 in the tip region 73 of the first mold part 54, and a portion 81 of the strap 80 in the strap region 78" of the second mold part 55, whereupon the head 23 is separated from the second mold part 55, the tip 24 is separated from the second mold part 55, and portions of the strap 80 are separated from both the first and second mold parts 54, 55.

Figure 26:
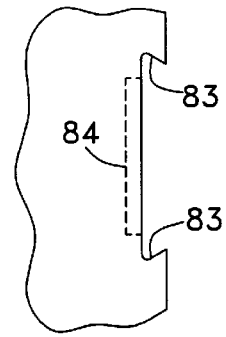
FIG. 26 illustrates undercuts within the tip region of the first mold part in the embodiment of FIG. 22, as seen along lines 26—26 in FIG. 23.

During the initial separation of the first mold part 54 from the second mold part 55, (a) undercuts 64, 65 located in the first mold part 54, as shown in FIG. 18, are used to retain a portion of the head 23 in the head region 56 of the first mold part 54; (b) undercuts 83, 84 located in the first mold part 54, as shown in FIG. 26, are used to retain a portion of the tip 24 in the tip region 73 of the first mold part 54; and (c) undercuts 66, 67 respectively located in sections 20—20 and 21—21 of the strap region 58" of the second mold part 55, as shown in FIGS. 20 and 21, are used to retain the portion 81 of the strap 80 in the strap region 78" of the second mold part 55. The first and second mold parts 54, 55 are separated from each other along the parting surface P shown in FIG. 18.

Figure 24:
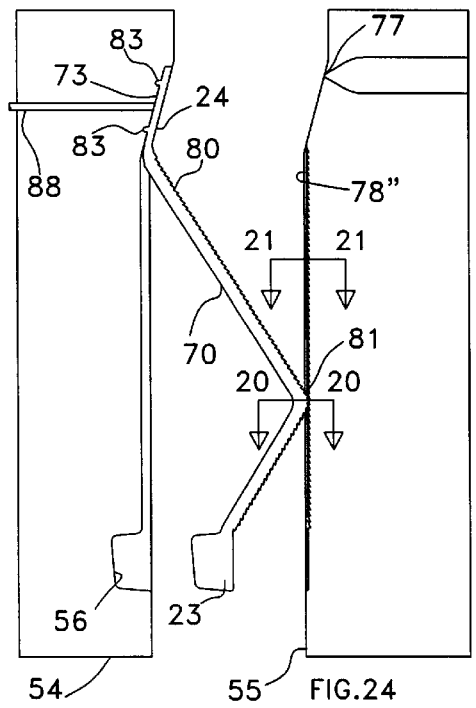
FIG. 24 is a diagram showing retention of a portion of the tip of the cable tie in the first mold part, retention of a portion of the strap of the cable tie in the second mold part, and removal of the head of the cable tie from the first mold part upon further separation of the mold parts in the embodiment of FIG. 22.

The first mold part 54 is further separated from the second mold part 55, as shown in FIG. 24, while still retaining a portion of the tip 24 in the tip region 73 of the first mold part 54 and a portion 81 of the strap 80 in the strap region 78" of the second mold part 55, to thereby remove the previously retained portion of the head 23 from the head region 56 of the first mold part 54. The relative dimensions of the undercuts 66 in section 20—20 of the strap region 78" of the second mold part 55 and the undercuts 64, 65 in the head region 56 of the first mold part 55 are such that during the further separation of the first and second mold parts 54, 55 shown in FIG. 24 the retention of the portion 81 of the strap 80 by the undercuts 66 located in section 20—20 of the strap region 78" of the second mold part 55 overcomes the retention of the portion of the head 23 by the undercuts 64, 65 located in the head region 56 of the first mold part 54 so that during such further separation of the first and second mold parts 54, 55 the portion 81 of the strap 80 is still retained in the strap region 78" of the second mold part 55 and the previously retained portion of the head 23 is then thereby removed from the head region 56 of the first mold part 54.

The relative dimensions of the undercuts 83, 84 in the tip region 73 of the first mold part 54 and the undercuts 67 in section 21—21 of the strap region 78" of the second mold part 55 are such that during the further separation of the first and second mold parts 54, 55 shown in FIG. 24 the retention of the portion of the tip 24 by the undercuts 83, 84 located in the tip region 73 of the first mold part 54 overcomes the retention of the strap 80 by the undercuts 67 located in section 21—21 of the strap region 78" of the second mold part 55 so that during such further separation of the first and second mold parts 54, 55 the portion of the tip 24 is still retained in the tip region 56 of the first mold part 54 and the portion of the strap 80 previously retained in section 21—21 of the strap region 78" is then thereby removed from the strap region 78" of the second mold part 55.

Figure 25:
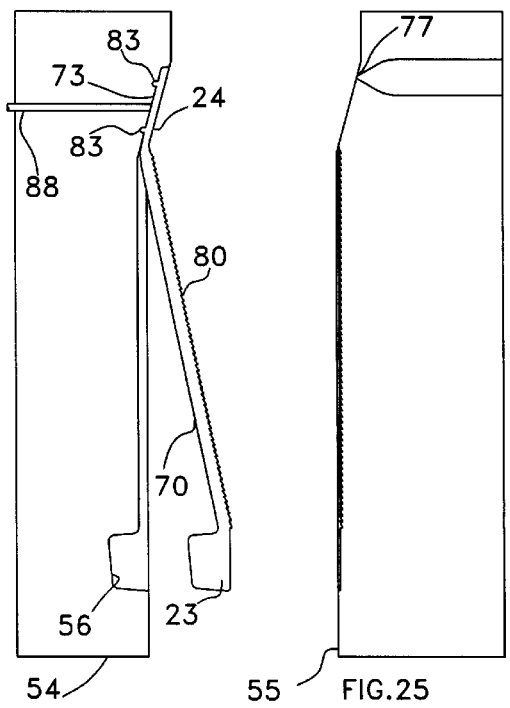
FIG. 25 is a diagram showing retention of a portion of the tip of the cable tie in the first mold part and removal of the strap of the cable tie from the second mold part upon still further separation of the mold parts in the embodiment of FIG. 22.

The first mold part 54 is still further separated from the second mold part 55, as shown in FIG. 25, while still retaining a portion of the tip 24 in the tip region 73 of the first mold part 54, to thereby remove the previously retained portion 81 of the strap 80 from the strap region 78" of the second mold part 55. The relative dimensions of the undercuts 83, 84 in the tip region 73 of the first mold part 73 and the undercuts 66 in section 20—20 of the strap region 58" of the second mold part 55 are such that during the still further separation of the first and second mold parts 54, 55 shown in FIG. 25 the retention of the portion of the tip 24 by the undercuts 83, 84 located in the tip region 73 of the first mold part 54 overcomes the retention of the strap 80 by the undercuts 66 located in section 20—20 of the strap region 78" of the second mold part 55 so that during such still further separation of the first and second mold parts 54, 55 the portion of the tip 24 is still retained in the tip region 73 of the first mold part 54 and the only remaining portion 81 of the strap 80 previously retained in section 20—20 of the strap region 78" is then thereby removed from the strap region 78" of the second mold part 55.

Subsequently, the previously retained portion of the tip 24 of the cable tie 70 is ejected from the tip region 73 of the first mold part 54 by using at least one ejector pin 88 or preferably a plurality of ejector pins located in the first mold part 54 adjacent the tip region 73. Then the ejected cable tie 70 is removed from the space between the first and second mold parts 54, 55 by imparting a forceful fluid stream against the ejected cable tie 70, or by utilizing other means, such as robotics or gravity.

The drawing figures do not show all of the features of the mold parts or the injection-molded cable tie, but rather show selected features that facilitate an understanding of various embodiments of the method of the present invention.

In various embodiments, not all of which are shown, (a) the molten plastic material is injected through a gate that is located in either the first mold part or the second mold part and adjacent either the tip region or the head region; (b) subsequent to the initial or further separation of the first and second mold parts, the previously retained portion of the head or the tip that is not retained upon the still further separation of the mold parts is ejected by using ejection means located in the first mold part; (c) subsequent to the initial or further separation of the first and second mold parts, previously retained portions of the strap are ejected by using ejection means located in the first and or second mold parts; and (d) ejection means other than ejector pins may be used, such as (i) means for imparting an air blast, or (ii) means for discontinuing retention of the portion of the head in the head region of the first mold part prior to full separation of the mold parts so that subsequent separation of the mold parts tugs upon and thereby ejects the head portion from the head region of the first mold part.

The undercuts in the mold parts may have any desired shape or form. It is usually desirable to make the undercuts in surfaces of the mold cavity that are perpendicular or nearly perpendicular to the mold opening direction.

Means other than undercuts, such as movable mold elements, can be used to retain the portion of the head and the portion of the tip that are retained in the respective mold parts. The movable elements are initially positioned for retaining and then repositioned for releasing.

The mold may include two or more mold parts; and the mold parts preferably define a plurality of mold cavities for forming a respective number of cable ties. Multiple mold cavities may be located in the mold along a single parting surface or in a stacked configuration that is operated in either a synchronous or desynchronous manner. It is immaterial how the mold is oriented for operation, such as horizontal, vertical, sideways, upside down, or any other position or direction.

The molten plastic material can be injected into an individual mold cavity through one or more gates via one or more mold parts by any type of runner system, such as a cold runner system, a hot runner system, an insulated runner system, a three-plate runner system, a submarine runner system, or others or combinations thereof.

While the above description contains many specificities, these should not be construed as limitations on the scope of the present invention, but rather as examples of the preferred embodiments described herein. Other variations are possible and the scope of the present invention should be determined not by the embodiments described herein but rather by the claims and their legal equivalents.

What is claimed is:

1. A method of injection molding a cable tie having a locking head, a strap extending from the head and terminating in a tip for passing through an opening in the head, and ratchet teeth on at least one side of the strap, wherein the locking head includes pawl having teeth with surfaces for engaging the ratchet teeth to lock the strap in the locking head after the tip end of the strap has been pulled through the opening in the head, the method comprising the steps of (a) forming the cable tie by injecting molten plastic material into a mold cavity defined by a first mold part combined with a second mold part, wherein the first mold part includes a tip region defining a portion of the tip of the cable tie and a head region defining a portion of the head of the cable tie, and said mold parts further define a strap region for forming a portion of the strap that extends between the head and the tip of the cable tie;

(b) separating the first mold part from the second mold part while retaining said portion of the tip in the tip region of the first mold part, said portion of the head in the head region of the first mold part and a portion of the strap in the strap region of the second mold part, to remove the tip from the second mold part, to remove the head from the second mold part, and to remove portions of the strap from the first mold part; and (c) removing said retained portions of the cable tie from the mold parts.

2. A method according to claim 1, wherein step (c) comprises the steps of:

(d) further separating the first mold part from the second mold part while still retaining said portion of the head in the head region of the first mold part and a portion of the strap in the strap region of the second mold part; and (e) removing said portion of the tip from the tip region of the first mold part.

3. A method according to claim 2, wherein step (c) further comprises the steps of:

(f) still further separating the first mold part from the second mold part while still retaining said portion of the head in the head region of the first mold part to remove the strap from the strap region of the second mold part; and (g) subsequent to step (f), ejecting said portion of the head from the head region of the first mold part.

4. A method according to claim 3, wherein step (e) comprises using at least one undercut located in the head region of the first mold part to retain said portion of the head in the head region of the first mold part.

5. A method according to claim 4, wherein step (d) comprises using at least one undercut located in the strap region of the second mold part to retain said portion of the strap in the strap region of the second mold part; and wherein during step (f) the retention of said portion of the head by the at least one undercut located in the head region of the first mold part overcomes the retention of said portion of the strap by the at least one undercut located in the strap region of the second mold part.

6. A method according to claim 5, wherein step (b) comprises using at least one undercut located in the tip region of the first mold part to retain said portion of the tip in the tip region of the first mold part; and wherein during step (d) the retention of said portion of the strap by the at least one undercut located in the strap region of the second mold part overcomes the retention of said portion of the tip by the at least one undercut located in the tip region of the first mold part.

7. A method according to claim 4, wherein step (e) is caused by step (d);

wherein step (d) comprises using at least one undercut located in the strap region of the second mold part to retain said portion of the strap in the strap region of the second mold part; and wherein during step (f) the retention of said portion of the head by the at least one undercut located in the head region of the first mold part overcomes the retention of said portion of the strap by the at least one undercut located in the strap region of the second mold part.

8. A method according to claim 7, wherein step (b) comprises using at least one undercut located in the tip region of the first mold part to retain said portion of the tip in the tip region of the first mold part; and wherein during step (d) the retention of said portion of the strap by the at least one undercut located in the strap region of the second mold part overcomes the retention of said portion of the tip by the at least one undercut located in the tip region of the first mold part.

9. A method according to claim 2, wherein step (e) is caused by step (d).

10. A method according to claim 2, wherein step (a) includes the step of:

(h) injecting said molten plastic material through a gate that is located adjacent the head of the cable tie formed by said injection.

11. A method according to claim 1, wherein step (c) comprises the steps of:

(d) further separating the first mold part from the second mold part while still retaining said portion of the tip in the tip region of the first mold part and a portion of the strap in the strap region of the second mold part; and (e) removing said portion of the head from the head region of the first mold part.

12. A method according to claim 11, wherein step (c) further comprises the steps of:
(f) still further separating the first mold part from the second mold part while still retaining said portion of the tip in the tip region of the first mold part to remove the strap from the strap region of the second mold part; and
(g) subsequent to step (f), ejecting said portion of the tip from the tip region of the first mold part.

13. A method according to claim 12, wherein step (f) comprises using at least one undercut located in the tip region of the first mold part to retain said portion of the tip in the tip region of the first mold part.

14. A method according to claim 13, wherein step (d) comprises using at least one undercut located in the strap region of the second mold part to retain said portion of the strap in the strap region of the second mold part; and
wherein during step (f) the retention of said portion of the tip by the at least one undercut located in the tip region of the first mold part overcomes the retention of said portion of the strap by the at least one undercut located in the strap region of the second mold part.

15. A method according to claim 14, wherein step (b) comprises using at least one undercut located in the head region of the first mold part to retain said portion of the head in the head region of the first mold part; and
wherein during step (d) the retention of said portion of the strap by the at least one undercut located in the strap region of the second mold part overcomes the retention of said portion of the head by the at least one undercut located in the head region of the first mold part.

16. A method according to claim 13, wherein step (e) is caused by step (d);
wherein step (d) comprises using at least one undercut located in the strap region of the second mold part to retain said portion of the strap in the strap region of the second mold part; and
wherein during step (f) the retention of said portion of the tip by the at least one undercut located in the tip region of the first mold part overcomes the retention of said portion of the strap by the at least one undercut located in the strap region of the second mold part.

17. A method according to claim 16, wherein step (b) comprises using at least one undercut located in the head region of the first mold part to retain said portion of the head in the head region of the first mold part; and
wherein during step (d) the retention of said portion of the strap by the at least one undercut located in the strap region of the second mold part overcomes the retention of said portion of the head by the at least one undercut located in the head region of the first mold part.

18. A method according to claim 11, wherein step (e) is caused by step (d).

19. A method according to claim 11, wherein step (a) includes the step of:
(h) injecting said molten plastic material through a gate that is located adjacent the tip of the cable tie formed by said injection.

20. A method according to claim 1, wherein step (a) includes the step of:
(d) injecting said plastic material through a gate located in the second mold part.

* * * * *